US011687253B2

(12) United States Patent
Pol

(10) Patent No.: US 11,687,253 B2
(45) Date of Patent: Jun. 27, 2023

(54) CONFIGURATION OF A COMPUTATIONAL DRIVE

(71) Applicant: HEWLETT PACKARD ENTERPRISE DEVELOPMENT LP, Houston, TX (US)

(72) Inventor: Daniel Pol, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/304,193

(22) Filed: Jun. 16, 2021

(65) Prior Publication Data
US 2022/0404986 A1 Dec. 22, 2022

(51) Int. Cl.
*G06F 3/06* (2006.01)
*G06F 9/4401* (2018.01)
(52) U.S. Cl.
CPC ............ *G06F 3/0622* (2013.01); *G06F 3/067* (2013.01); *G06F 3/0629* (2013.01); *G06F 9/4406* (2013.01)
(58) Field of Classification Search
None
See application file for complete search history.

(56) References Cited

U.S. PATENT DOCUMENTS

2020/0310694 A1 10/2020 Gao et al.

FOREIGN PATENT DOCUMENTS

WO WO-2020186081 9/2020

OTHER PUBLICATIONS

Torabzadehkashi, M., Rezaei, S., HeydariGorji, A. et al. Computational storage: an efficient and scalable platform for big data and HPC applications. J Big Data 6, 100 (2019). (Year: 2019).*
Do, J., Ferreira, V., Bobarshad, H., Torabzadehkashi, M., et al. 2020. Cost-effective, Energy-efficient, and Scalable Storage Computing for Large-scale AI Applications. ACM Trans. Storage 16, 4, Article 21 (Nov. 2020), 37 pages. (Year: 2020).*
Lu Y.; "Towards High Performance Disaggregated Flash Storage with Programmable NIC"; 2017; 3 pages.
Marko K.; "How the computational storage drive is changing computing"; Dec. 11, 2020; 3 pages.
NGD Systems, Inc.; "NGD Systems Computational Storage Devices Now Support Containers for Flexible Application Deployment"; May 23, 2012; 3 pages; <https://www.ngdsystems.com/page/NGD-Systems-Computational-Storage-Devices-Now-Support-Containers-for-Flexible-Application-Deployment>.
SNIA; "Computational Storage Architecture and Programming Model"; Aug. 6, 2020; 66 pages.

(Continued)

*Primary Examiner* — Edward J Dudek, Jr.
*Assistant Examiner* — Ralph A Verderamo, III
(74) *Attorney, Agent, or Firm* — Trop, Pruner & Hu, P.C.

(57) ABSTRACT

Examples implementations relate to configuration of computational drives. An example computational drive includes a housing to be inserted in a drive bay of a host device, and persistent storage. The computational drive may also include a processor to respond to an insertion of the housing into the drive bay of the host device by configuring the computational drive to operate as a new node of a distributed file system, and connecting the computational drive to the distributed file system as the new node.

20 Claims, 7 Drawing Sheets

(56) References Cited

OTHER PUBLICATIONS

Tiomkin E.; "Edge Compute and NVMe Computational Storage—AWS Greengrass": Oct. 6, 2020: 5 pages; <https://www.ngdsystems.com/page/Edge-Compute-and-NVMe-Computational-Storage--AWS-Greengrass>.

Brandon Lee, "VMware Project Monterey Unveiled with ESXi on SmartNIC", available online at <https://www.virtualizationhowto.com/2020/09/vmware-project-monterey-unveiled-with-esxi-on-smartnic/>, Sep. 29, 2020, 6 pages.

Kurt Marko, "How the computational storage drive is changing computing", available online at <https://searchstorage.techtarget.com/feature/How-the-computational-storage-drive-is-changing-computing> Dec. 11, 2020, 7 pages.

Mellanox, "An Introduction to Smartnics", available online at <https://www.nextplatform.com/2019/03/04/an-introduction-to-smartnics/>, TheNextPlatform, Mar. 4, 2019, 6 pages.

Nutanix, "The Nutanix Bible", available online at <<https://web.archive.org/web/20210518154153/https://www.nutanixbible.com/>>, May 18, 2021, 380 pages.

SNIA, "What Is a Storage Area Network (SAN)?", available online at <https://web.archive.org/web/20210501043008/https://www.snia.org/education/storage_networking_primer/san/what_san>, May 1, 2021, 3 pages.

SNIA, "What is NAS (Network Attached Storage) and why is NAS Important?", available online at <https://web.archive.org/web/20210430172527/https://www.snia.org/education/what-is-nas>, Apr. 30, 2021, 3 pages.

\* cited by examiner

CONFIGURATION OF A COMPUTATIONAL DRIVE

BACKGROUND

Some computing systems can be modified by adding modules or other devices. For example, a computer server may include slots and/or interfaces to receive storage devices.

BRIEF DESCRIPTION OF THE DRAWINGS

Some implementations are described with respect to the following figures.

Figure 1:
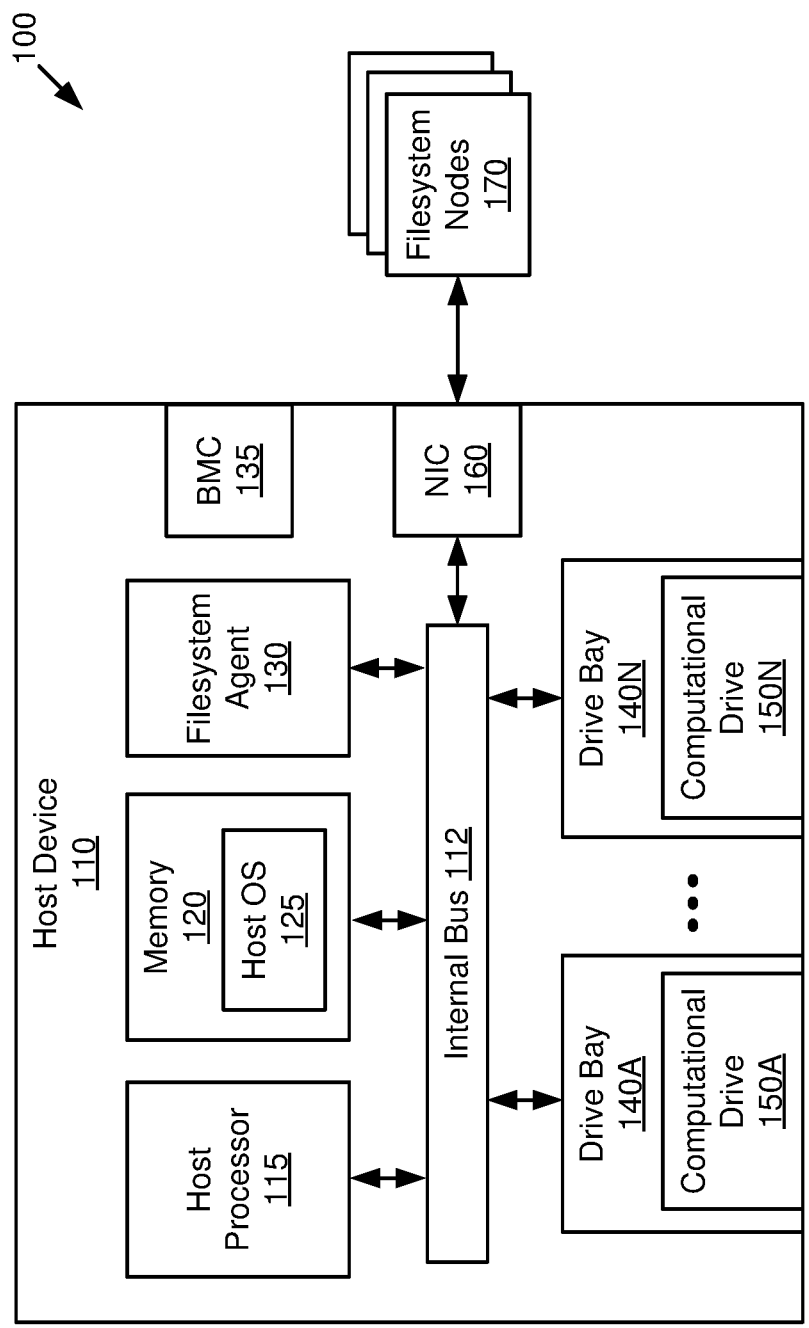
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Some computing systems may be implemented across multiple devices. For example, as used herein the term "distributed file system (DFS)" refers to a data storage system using multiple nodes connected via network links. Each node of the DFS may include processing resources (e.g., a central processor) and storage resources (e.g., storage drives). In some examples, setting up a DFS may require substantial configuration work by a human expert. Further, each node of the DFS may include a minimum set of hardware components that are not utilized at full capacity. Moreover, if the desired size or capacity of the DFS changes over time, additional work may be required to add more nodes to the DFS. Accordingly, setting up and maintaining a DFS may involve significant time and expense.

As used herein, the term "computational drive" refers to a storage device that includes a housing, persistent storage, a processor, an interface, and memory. For example, a computational drive may include a 2 TB solid state drive (SSD) (e.g., using flash memory), a 4-core central processor, 4 GB of random-access memory (RAM), and a Non-Volatile Memory Express (NVMe) interface. In some implementations, the housing of the computational drive has a form factor adapted to be inserted in or "plugged into" a drive bay of a host device (e.g., a server, a storage host, etc.). Further, the interface may provide data and/or power connections to the computational drive when plugged into the drive bay.

In accordance with some implementations of the present disclosure, plugging a computational drive into a drive slot of a host server may cause an initialization or "boot up" of the computational drive (e.g., by executing an operating system stored on the computational drive). The computational drive may then access file system configuration information (e.g., from a filesystem agent at a predefined location in the host), and may use this information to configure itself into a new node of a distributed file system. The configuration of the new node, as well as file system access to/from the new node, may be performed automatically without involving a processor (e.g., a central processing unit) or an operating system of the host server, and without requiring direct by a human user. Further, because a new node can be added by plugging a computational drive into an unused drive bay of an existing host server, the distributed file system can be set up or expanded without requiring the purchase and set up of a new host device for the new node. Accordingly, some implementations may reduce the cost and complexity of setting up or expanding the distributed file system. Furthermore, some implementations may include multiple computational drives to communicate directly with each via an internal bus (e.g., a Peripheral Component Interconnect express (PCIe) bus), and may thereby provide improved performance of the distributed file system.

As used herein, a "drive" can include a storage device or an array of storage devices. A drive may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

1. Example System

FIG. 1 shows an example of a system 100, in accordance with some implementations. As shown, the system 100 may include a host device 110 coupled via a network to any number of filesystem nodes 170. The filesystem nodes 170 may be nodes included in a distributed file system (DFS). For example, each filesystem node 170 may include processing and storage resources (not shown). Further, the filesystem nodes 170 may be interconnected via network links.

As shown, the host device 110 may include a host processor 115, memory 120, a filesystem agent 130, a baseboard management controller (BMC) 135, an internal bus 112, a network interface card (MC) 160, and any number of drive bays 140A-140N (also referred to herein as "drive bays 140"). The host processor 115 can include a microprocessor, a microcontroller, a processor module or subsystem, a programmable integrated circuit, a programmable gate array, multiple processors, a microprocessor including multiple processing cores, or another control or computing device. The memory 120 can be any type of computer memory (e.g., dynamic random access memory (DRAM), static random-access memory (SRAM), etc.). In some examples, the memory 120 may include a host operating system (OS) 125 of the host device 110.

The internal bus 112 may be a communication system to transfer data between components of the host device 110 (e.g., a Peripheral Component Interconnect (PCI) bus, a Peripheral Component Interconnect express (PCIe) bus, and so forth). In some implementations, the NIC 160 may be an intelligent interface device that includes a processor (not shown in FIG. 1). For example, the processor of the NIC 160 may provide processing (e.g., decryption, decompression, etc.) of packets received via a network connection.

In some implementations, the BMC 135 may be a specialized microcontroller embedded on an expansion card or on a motherboard of the host device 110. For example, the BMC 135 may support the Intelligent Platform Management Interface (IPMI) architecture, which defines a set of common interfaces to computer hardware and firmware that system administrators can use to monitor health and manage a computing device. Further, the BMC 135 may provide remote management access to the host device 110, and may provide such remote management access over an out-of-band communication channel, which isolates management communication from communication of the host OS 125. In some implementations, the BMC 135 may enable lights-out management of the host device 110, which provides remote management access (e.g., system console access) to the host device 110 regardless of whether the host device 110 is powered on, whether a primary network subsystem hardware is functioning, or whether the host OS 125 of the host device 110 is operating.

In some implementations, the filesystem agent 130 may be a software agent that is dedicated for providing configuration information for new nodes of a particular distributed file system (e.g., an implementation of the HPE Ezmeral Data Fabric, produced by Hewlett Packard Enterprise). For example, the filesystem agent 130 may be a software program that runs without continuous direct supervision from the host OS 125 of the host device 110. The filesystem agent 130 may be accessed by a computational drive 150 at a known location (e.g., a predefined network address and port, a loopback network address, and so forth). Upon receiving a request from a computational drive 150, the filesystem agent 130 may respond by sending configuration information that allows the computational drive 150 to configure itself as a new node of the distributed file system. For example, such configuration information may include a unique identifier for the new node, access credentials and/or protocols for the distributed file system, a network address and/or identifier of a master node of the distributed file system, network addresses and ports of other nodes, and so forth.

Note that, although FIG. 1 illustrates one possible implementation of the filesystem agent 130, other implementations are possible. For example, the filesystem agent 130 may be executed by the host processor 115. In another example, the filesystem agent 130 may be included in or otherwise provided by the NIC 160 (e.g., executed by a processor of the MC 160). In still another example, the filesystem agent 130 may be included in or otherwise provided by the BMC 135 (e.g., executed by a processor of the BMC 135). In yet another example, the filesystem agent 130 may be included in or otherwise provided by a component or service that is external to the host device 110.

As shown in FIG. 1, the drive bays 140 may be any feature of the host device 110 that is configured to receive or otherwise be connected to computational drives 150A-150N (also referred to herein as "computational drives 150") and/or non-computational drives (e.g., a storage drive without an on-board processor for executing instructions). For example, the drive bays 140 may include a hard disk drive bay, an expansion card slot, a memory module slot (e.g., a dual in-line memory module (DIMM) slot), and so forth. In some implementations, plugging a computational drive 150 into a drive bay 140 may cause the computational drive 150 to boot up and configure itself to act as a new node of a distributed file system that includes the filesystem nodes 170. Some example operations of a computational drive 150 are described below with reference to FIGS. 2A-2C.

Note that, while FIG. 1 show an example system 100, implementations are not limited in this regard. For example, it is contemplated that the system 100 and/or the host device 110 may include additional devices and/or components, fewer components, different components, different arrangements, and so forth. In another example, it is contemplated that the functionality of the computational drive 150 described above may be included in any another engine or software of the computational drive 150. Other combinations and/or variations are also possible.

2. Example Implementation of a Computational Drive

Figure 2A:
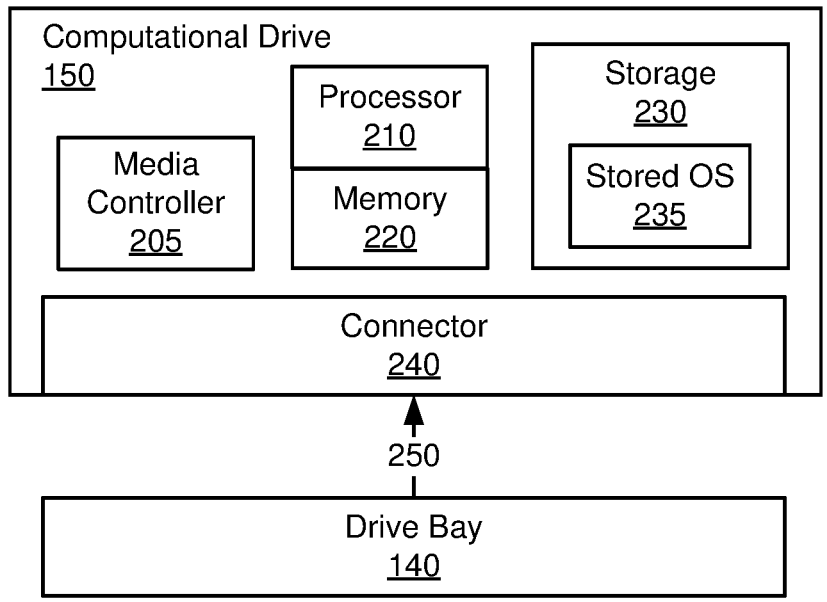
FIGS. 2A-2C are illustrations of example operations, in accordance with some implementations.
Figure 2B:
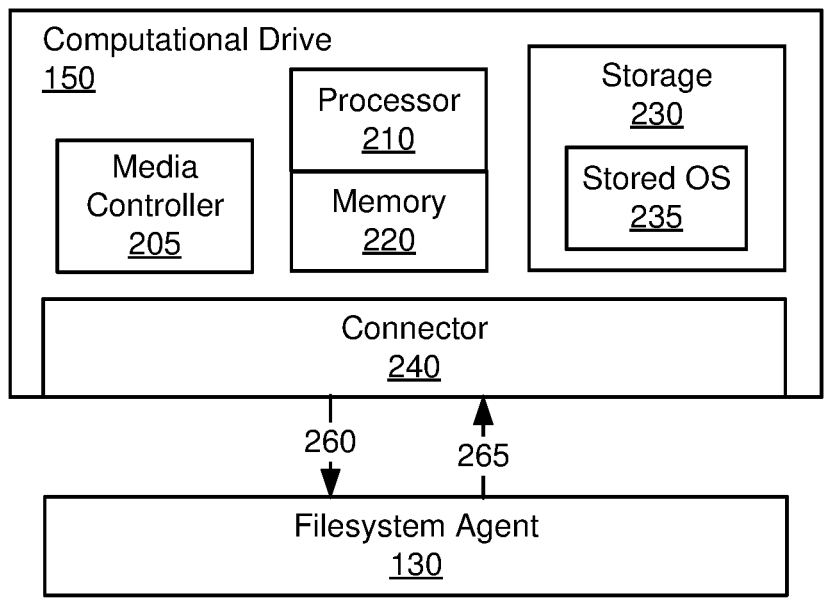
Figure 2C:
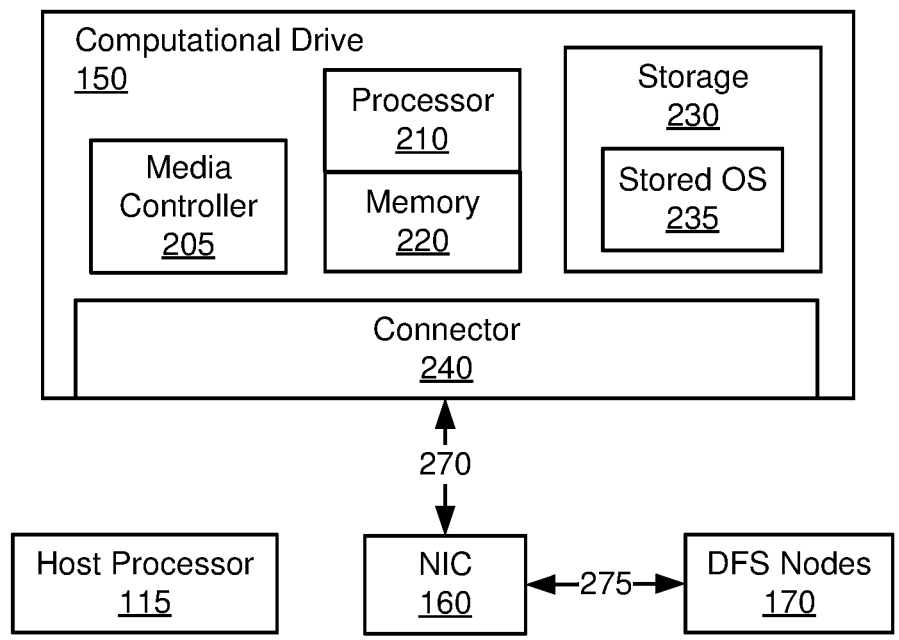

Referring to FIGS. 2A-2C, shown are example operations of a computational drive 150. The computational drive 150 may include a media controller 205, a processor 210, memory 220, storage 230, and a connector 240.

The processor 210 can include a microprocessor, a microcontroller, a processor module or subsystem, a programmable integrated circuit, a programmable gate array, multiple processors, a microprocessor including multiple processing cores, or another control or computing device. The memory 220 can be any type of computer memory (e.g., DRAM, SRAM, etc.). The connector 240 may provide a physical connection, a data transfer connection, and/or an electrical power connection between the computational drive 150 and the drive bay 140. The media controller 205 may be an electronic component to control the transfer of data from the storage 230 to an external device via a communication link (e.g., via the connector 240). The storage 230 can include non-transitory persistent storage media such as a hard disk drive (HDD), solid state drives (SSDs), optical disks, and so forth, or a combination thereof. As shown, the storage 230 may include a stored operating system (OS) 235. In some implementations, the computational drive 150 may use a NVMe interface.

Referring now to FIG. 2A, when the computational drive 150 is initially plugged into a drive bay 140, the computational drive 150 may receive electrical power 250 via the connector 240. For example, the connector 240 may be a PCIe connector that provides electrical power and data connections when coupled to the drive bay 140. Further, receiving the electrical power 250 may cause the computational drive 150 to perform a booting process. For example, receiving the electrical power 250 may cause the processor 210 to read and execute the stored OS 235 from the storage 230. In some examples, the stored OS 235 may be a specialized OS for execution on the computational drive 150.

Referring now to FIG. 2B, after completing the booting process, the computational drive 150 may send a request 260 to the filesystem agent 130 (e.g., at a predefined network address and port of a host device) associated with a particular distributed file system, and in response may receive configuration information 265 from the filesystem agent 130. The computational drive 150 may use the received configuration information 265 to configure itself as a new node of the distributed file system. In some implementations, configuring the new node using the received configuration information 265 may be performed without involving a host processor or OS. For example, after receiving the configuration information 265 from the filesystem agent 130, the configuration of the new node may not use a datapath of the host processor 115 or the host OS 125 (shown in FIG. 1). Further, the configuration of the new node may be performed automatically (e.g., without requiring configuration work by a human user). Accordingly, some implementations may reduce the cost and/or complexity of setting up the distributed file system in comparison to conventional techniques.

Referring now to FIG. 2C, upon configuring itself, the computational drive 150 may be connected to the distributed file system as a new node, and may be accessed as part of the distributed file system. For example, the computational drive 150 may directly communicate 270 with the MC 160, and may thereby connect 275 with other nodes 170 of the distributed file system. In this manner, the computational drive 150 can operate as a new node of the distributed file system without involving other resources of a host device (e.g., without using a datapath or bandwidth of the host processor 115, the memory 120, the host OS 125, or the filesystem agent 130 shown in FIG. 1). The computational drive 150 and the other nodes 170 may communicate directly with each other over the path 270, 275 through the NIC 160 (e.g., a smart network card). Further, the MC 160 may keep the path 270, 275 to be separate and isolated from network traffic of the host device 110 (e.g., packets to/from the host OS 125). In some examples, the new node (i.e., the configured computational drive 150) may appear to other nodes or users as an individual server providing a storage service, and may only be accessed via the distributed file system.

In some implementations, a single host device may include multiple nodes of a distributed file system. For example, referring again to FIG. 1, the computational drives 150A and 150N may be configured as separate nodes of a distributed file system. In this example, the computational drives 150A and 150N may communicate directly with each other as file system nodes via the internal bus 112 (e.g., a PCIe bus).

3. Example Process

Figure 3:
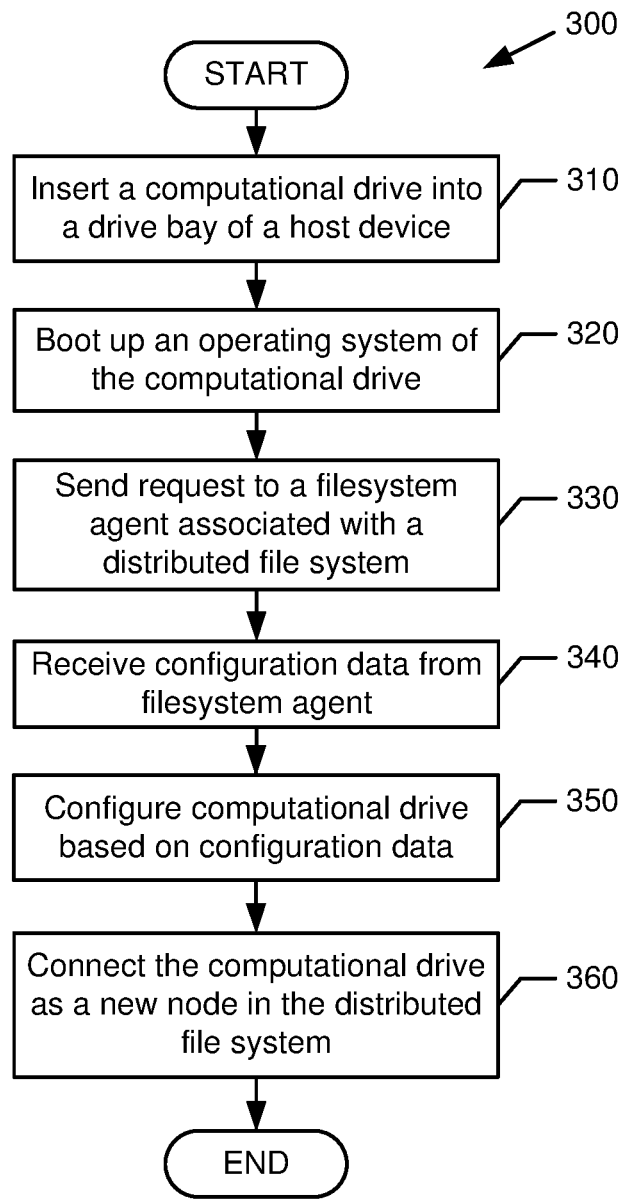
FIG. 3 is an illustration of an example process, in accordance with some implementations.

Referring now to FIG. 3, shown is an example process 300, in accordance with some implementations. In some examples, the process 300 may be performed using the host device 110 and/or the computational drive 150 (shown in FIGS. 1-2B). The process 300 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 300 may be described below with reference to FIGS. 1-2B, which show examples in accordance with some implementations. However, other implementations are also possible.

Block 310 may include inserting a computational drive into a drive bay of a host device. Block 320 may include booting up an operating system of the inserted computational drive. For example, referring to FIGS. 1-2A, the computational drive 150 is plugged into (or is otherwise connected to) a drive bay 140 of the host device 110, and may then receive electrical power 250 via the connector 240. The processor 210 of the computational drive 150 then reads and executes the stored OS 235 from the storage 230 included in the computational drive 150.

Block 330 may include sending a request to a filesystem agent associated with a distributed file system. Block 340 may include receiving configuration data from the filesystem agent. For example, referring to FIGS. 1-2B, the computational drive 150 sends the request 260 to the filesystem agent 130 (e.g., a predefined network address and port of the host device 110), and in response receives the configuration information 265 from the filesystem agent 130. The received configuration information 265 may include a unique node identifier for the computational drive 150, access credentials of a distributed file system, a network address of a master node of the distributed file system, and so forth. In various implementations, the filesystem agent 130 may be executed by the host processor 115, may be executed by a processor of the NIC 160, may be executed by a processor of the BMC 135, and so forth.

Block 350 may include configuring the computational drive based on the received configuration data. Block 360 may include connecting the computational drive as a new node in the distributed file system. For example, referring to FIGS. 1-2B, the computational drive 150 uses the received configuration information 265 to configure itself as a new node of the distributed file system. After this configuration is completed, the computational drive 150 is connected to the distributed file system as a new node. The new node can then be accessed as part of the distributed file system (e.g., for data read operations, for data write operations, etc.) via a node datapath. In some examples, the node datapath includes a network interface of the host device (e.g., MC 160 shown in FIG. 1), but does not include a processor or memory of the host device (e.g., host processor 115 or memory 120 shown in FIG. 1). After block 360, the process 300 may be completed. In some implementations, blocks 330, 340, 350, and 360 may be performed by the stored OS 235 executing on the processor 210 of the computational drive 150.

4. Example Process

Figure 4:
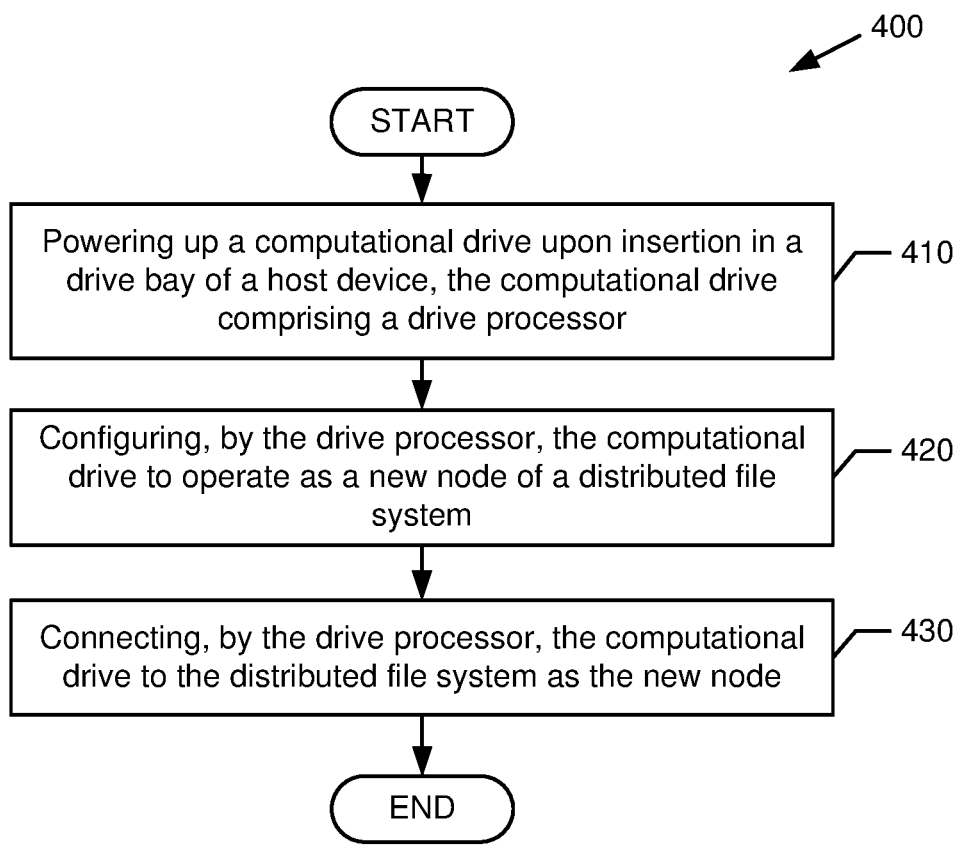
FIG. 4 is an illustration of an example process, in accordance with some implementations.

Referring now to FIG. 4, shown is an example process 400, in accordance with some implementations. In some examples, the process 400 may be performed using the host device 110 and/or the computational drive 150 (shown in FIGS. 1-2B). The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 400 may be described below with reference to FIGS. 1-2B, which show examples in accordance with some implementations. However, other implementations are also possible.

Block 410 may include powering up a computational drive upon insertion in a drive bay of a host device, the computational drive comprising a drive processor. For example, referring to FIGS. 1-2A, the computational drive 150 is plugged into the drive bay 140, and then receives electrical power 250 via the connector 240. In some examples, the processor 210 of the computational drive 150 may read and execute the stored OS 235 from the storage 230 included in the computational drive 150.

Block 420 may include configuring, by the drive processor, the computational drive to operate as a new node of a distributed file system. For example, referring to FIGS. 1-2B, the computational drive 150 sends the request 260 to the filesystem agent 130 (e.g., a predefined network address and port of the host device 110), and in response receives the configuration information 265 from the filesystem agent 130. The computational drive 150 uses the received configuration information 265 to configure itself as a new node of the distributed file system.

Block 430 may include connecting, by the drive processor, the computational drive to the distributed file system as the new node. For example, referring to FIGS. 1-2B, the configured computational drive 150 may send a request to a master node to connect the distributed file system as a new node. Once connected, the new node can be accessed as part of the distributed file system (e.g., for data read operations, data write operations, and so forth). After block 430, the process 400 may be completed.

5. Example Machine-Readable Medium

Figure 5:
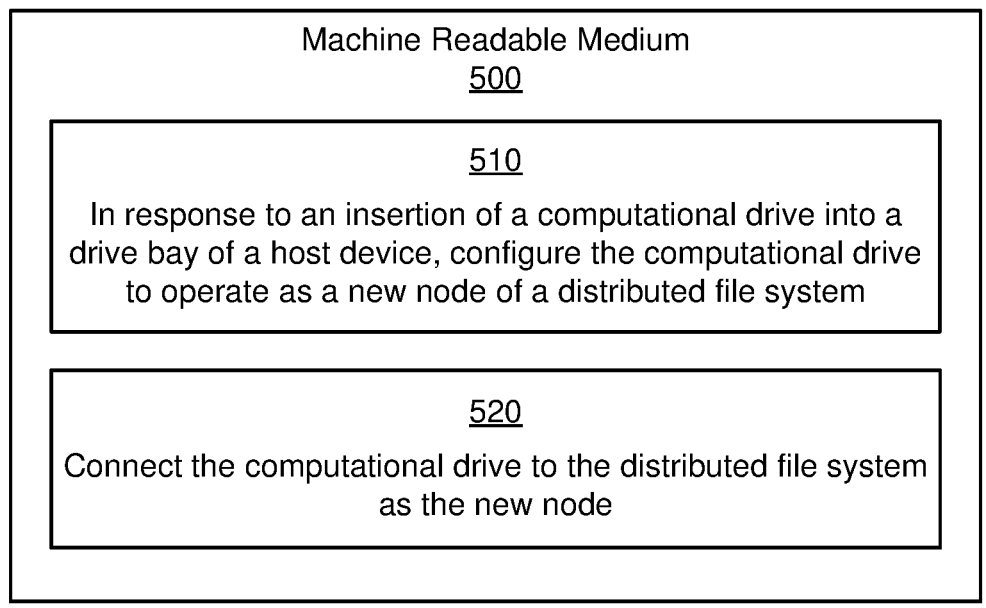
FIG. 5 is a diagram of an example machine-readable medium storing instructions in accordance with some implementations.

FIG. 5 shows a machine-readable medium 500 storing instructions 510-520, in accordance with some implementations. The instructions 510-520 can be executed by a single processor, multiple processors, a single processing engine, multiple processing engines, and so forth. The machine-readable medium 500 may be a non-transitory storage medium, such as an optical, semiconductor, or magnetic storage medium. In some implementations, the instructions 510-520 may be performed by an operating system stored on a computational drive (e.g., by the stored OS 235 executing on the processor 210 of the computational drive 150).

Instruction 510 may be executed to, in response to an insertion of a computational drive into a drive bay of a host device, configure the computational drive to operate as a new node of a distributed file system. Instruction 520 may be executed to connect the computational drive to the distributed file system as the new node. For example, referring to FIGS. 1-2B, upon being plugged into the drive bay 140, the computational drive 150 may receive electrical power 250 via the connector 240, and may read and execute the stored OS 235 from the storage 230. The computational drive 150 send the request 260 to the filesystem agent 130, and in response may receive the configuration information 265. The computational drive 150 may configure itself to operate a new node of a distributed file system based on the received configuration information 265 (e.g., via execution of instruction 510). The configured computational drive 150 may then connect to and be accessed as a new node of the distributed file system (e.g., via execution of instruction 520).

6. Example Computational Drive

Figure 6:
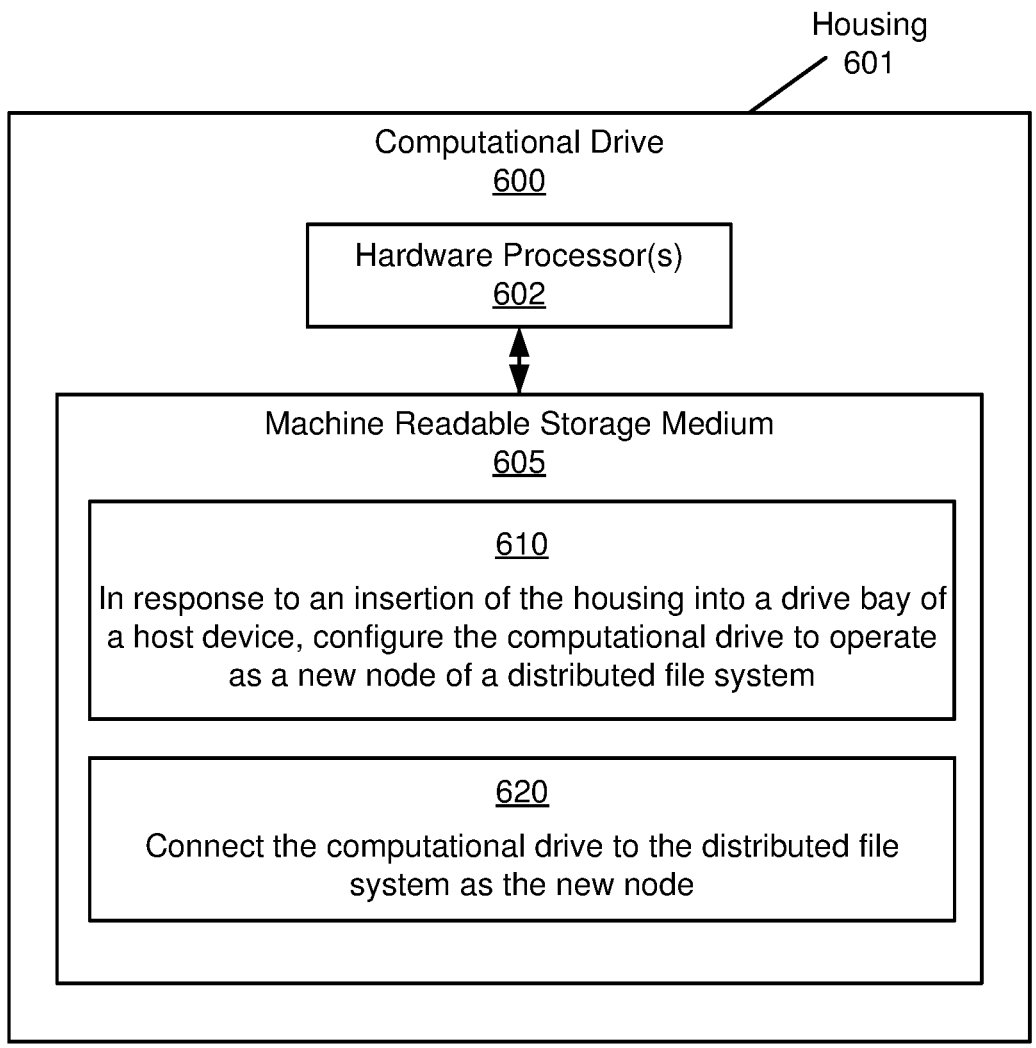
FIG. 6 is a schematic diagram of an example computing device, in accordance with some implementations.

FIG. 6 shows a schematic diagram of an example computational drive 600. In some examples, the computational drive 600 may correspond generally to a computational drive 150 (shown in FIG. 1). As shown, the computational drive 600 may include hardware processor 602 and machine-readable storage 605 including instructions 610-620. The machine-readable storage 605 may be a non-transitory medium. The instructions 610-620 may be executed by the hardware processor 602, or by a processing engine included in hardware processor 602. In some implementations, the computational drive 600 may have a housing 601 that is configured to be plugged into (or otherwise connected to) a drive bay of a host device (e.g., drive bay 140 of host device 110, as shown in FIG. 1). In some implementations, the instructions 610-620 may be performed by an operating system stored on a computational drive (e.g., by the stored OS 235 executing on the processor 210 of the computational drive 150).

Instruction 610 may be executed to, in response to an insertion of the housing into a drive bay of a host device, configure the computational drive to operate as a new node of a distributed file system. Instruction 620 may be executed to connect the computational drive to the distributed file system as the new node. For example, referring to FIGS. 1-2B, upon being plugged into the drive bay 140, the computational drive 150 may receive electrical power 250 via the connector 240, and may read and execute the stored OS 235 from the storage 230. The computational drive 150 send the request 260 to the filesystem agent 130, and in response may receive the configuration information 265. The computational drive 150 may configure itself to operate a new node of a distributed file system based on the received configuration information 265. The configured computational drive 150 may then connect to and be accessed as a new node of the distributed file system.

In accordance with implementations described herein, plugging a computational drive into a drive slot of a host server may cause the computational drive to boot up and configure itself into a new node of a distributed file system. The configuration of the new node, as well as the file system access to/from the new node, may be performed automatically without involving a central processing unit or operating system of the host server, and without requiring direct intervention by a human user. Further, because a new node can be added by plugging a computational drive into an unused drive bay of an existing host server, the distributed file system can be set up or expanded without requiring the purchase and set up of a new host device for the new node. Accordingly, some implementations may reduce the cost and complexity of setting up or expanding the distributed file system.

Note that, while FIGS. 1-6 show various examples, implementations are not limited in this regard. For example, referring to FIG. 1, it is contemplated that the system 100 and/or the host device 110 may include additional devices and/or components, fewer components, different components, different arrangements, and so forth. In another example, it is contemplated that the functionality of the computational drive 150 described above may be included in any another engine or software of the computational drive 150. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computational drive comprising:
   a housing to be inserted in a drive bay of a host device;
   persistent storage; and
   a processor to:
     in response to an insertion of the housing into the drive bay of the host device, configure the computational drive to operate as a new node of a distributed file system; and
     connect the computational drive to the distributed file system as the new node.

2. The computational drive of claim 1, wherein a datapath from the computational drive to another node of the filesystem cluster does not include a host processor of the host device.

3. The computational drive of claim 1, the processor to, in response to the insertion of the housing into the drive bay:
   boot up an operating system stored in the persistent storage; and
   send a request for configuration information to a filesystem agent included in the host device.

4. The computational drive of claim 3, the processor to:
   receive the configuration information from the filesystem agent included in the host device; and
   configure the computational drive to operate as the new node based on the configuration information received from the filesystem agent.

5. The computational drive of claim 4, wherein the configuration information received from the filesystem agent comprises at least one of:
   a unique identifier for the new node;
   one or more credentials to connect to the filesystem cluster; and
   a network address of a control node of the filesystem cluster.

6. The computational drive of claim 3, wherein the filesystem agent is executed on a network interface card of the host device.

7. The computational drive of claim 3, wherein the filesystem agent is executed on a baseboard management controller (BMC) of the host device.

8. The computational drive of claim 3, the processor to send the request for configuration information to a predefined network address and port of the host device.

9. The computational drive of claim 1, comprising:
   a connector to provide data and power connections while the housing is inserted into the drive bay.

10. The computational drive of claim 1, comprising:
    a memory coupled to the processor.

11. A computer implemented method comprising:
    powering up a computational drive upon an insertion in a drive bay of a host device, the computational drive comprising a drive processor;
    configuring, by the drive processor, the computational drive to operate as a new node of a distributed file system; and
    connecting, by the drive processor, the computational drive to the distributed file system as the new node.

12. The computer implemented method of claim 11, comprising, upon the insertion of the housing into the drive bay:
    booting up, by the drive processor, an operating system stored in the persistent storage; and
    sending, by the drive processor, a request for configuration information to a filesystem agent included in the host device.

13. The computer implemented method of claim 12, comprising:
    receiving the configuration information from the filesystem agent included in the host device; and
    configuring the computational drive to operate as the new node based on the configuration information received from the filesystem agent included in the host device.

14. The computer implemented method of claim 11, comprising, after connecting the computational drive to the distributed file system as the new node:
    accessing the new node as part of the distributed file system via a node datapath, wherein the node datapath includes a network interface of the host device, and wherein the node datapath does not include a host processor of the host device.

15. The computer implemented method of claim 11, comprising:
    executing the filesystem agent on a baseboard management controller (BMC) of the host device.

16. A non-transitory machine-readable medium storing instructions that upon execution cause a processor to:
    in response to an insertion of a computational drive into a drive bay of a host device, configure the computational drive to operate as a new node of a distributed file system; and
    connect the computational drive to the distributed file system as the new node.

17. The non-transitory machine-readable medium of claim 16, including instructions that upon execution cause the processor to:
    boot up an operating system stored in the persistent storage; and
    send a request for configuration information to a filesystem agent included in the host device.

18. The non-transitory machine-readable medium of claim 16, including instructions that upon execution cause the processor to:
- receive the configuration information from the filesystem agent included in the host device; and
- configure the computational drive to operate as the new node based on the configuration information received from the filesystem agent included in the host device.

19. The computer implemented method of claim 11, comprising, after connecting the computational drive to the distributed file system as the new node:
- access the new node as part of the distributed file system via a node datapath, wherein the node datapath includes a network interface of the host device, and wherein the node datapath does not include a host processor of the host device.

20. The non-transitory machine-readable medium of claim 16, wherein the configuration information received from the filesystem agent comprises at least one of:
- a unique identifier for the new node;
- one or more credentials to connect to the filesystem cluster; and
- a network address of a control node of the filesystem cluster.

* * * * *